Jan. 2, 1951    G. R. LEE    2,536,378
ADJUSTABLE POINT MARKING GAUGE
Filed Feb. 20, 1950
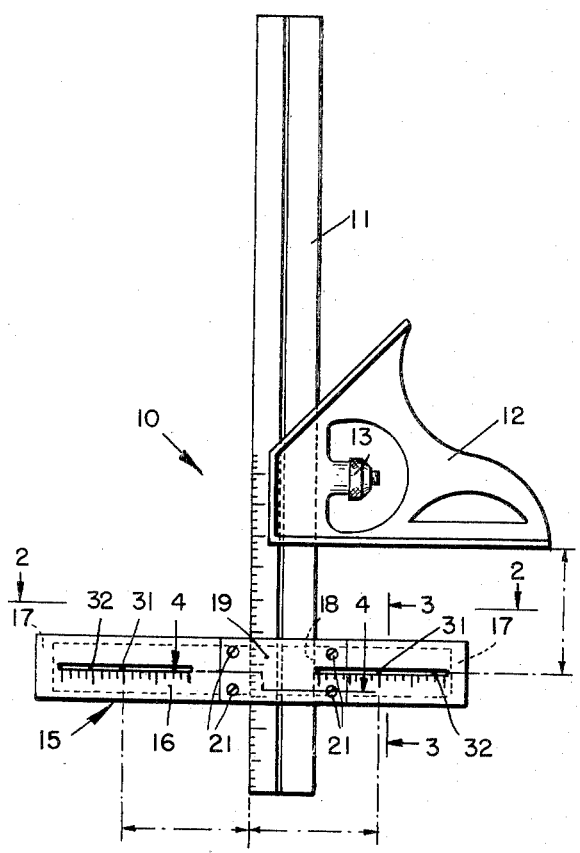
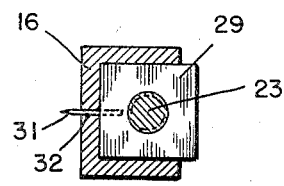
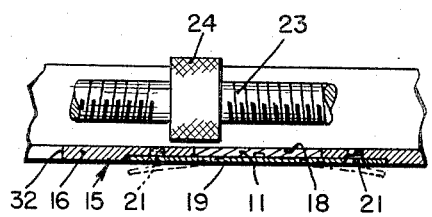
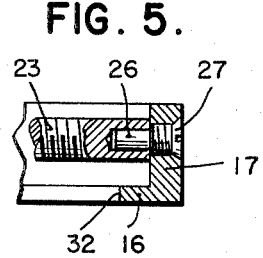
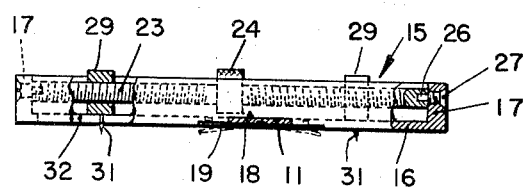
INVENTOR
GEORGE ROBERT LEE
BY
ATTORNEY Patented Jan. 2, 1951

2,536,378

UNITED STATES PATENT OFFICE 2,536,378

ADJUSTABLE POINT MARKING GAUGE

George Robert Lee, Glendale, Calif.

Application February 20, 1950, Serial No. 145,205

1 Claim. (Cl. 33—189)

The present invention relates to gages in general and particularly to an adjustable gage used by carpenters. More specifically the invention comprises a manually adjustable gage particularly useful in centering bolt holes for handles, etc.

The gage comprising the present invention is adapted for many uses and particularly in fixing centers with respect to a vertical and a horizontal plane. In one particular application the gage is used for the fixing of the centers of the supporting bolts of drawer handles. It is desirable that the supporting bolts for the drawer be positioned at a certain distance below the upper edge of the drawer, and usually at equal distances upon opposite sides of a medial center line. With a gage constructed in accordance with the present invention the center marks can be placed at the exact desired distance below the top edge of the drawer and at equal distances upon opposite sides of a medial vertical center line by means of a simple adjustment. When in place the user can deliver a slight tapping blow to the gage thereby making an impression in the face of the drawer which can then be used as the centers of the bolt holes.

With an understanding of the problems encountered by carpenters in centering drawer handles and the like it is an object of the present invention to provide a new and improved adjustable gage particularly useful in locating the supporting bolts of drawer handles.

It is another object of the invention to provide a gage adapted to be supported at predetermined distances below a supporting surface and which includes marking means which are laterally adjustable on opposite sides of a medial center line.

Still another object of the invention is to provide a marking gage unit for carpenters which comprises in combination a Starrett rule and a vertically adjustable unit slidable thereon and including laterally adjustable markers.

These and other more specific objects will appear upon reading the following specification and claim and upon considering in connection therewith the attached drawing to which they relate.

Referring now to the drawing in which a preferred embodiment of the invention is illustrated:

Figure 1 shows the gage constructed in accordance with the present invention;

Figure 2 is a view looking in the direction of the arrows upon the line 2—2 of Figure 1;

Figure 3 is a vertical transverse section upon the line 3—3 of Figure 1 and shows the laterally adjustable pin-carrying runners;

Figure 4 is a horizontal section upon the line 4—4 of Figure 1 and discloses the manually adjustable means by which the runners are laterally adjusted; and Figure 5 is an enlarged showing of the end mounting of the rotatable screw.

In the drawing the gage constructed in accordance with the present invention is indicated generally by the reference character 10 and includes a Starrett rule comprising an elongated ruler 11, preferably of metal with distance markings along one edge, and on which a runner 12 is longitudinally adjustable, being adapted to be retained in set positions by means of a manually operable adjustment 13 in a conventional manner. The Starrett rule itself, comprising the ruler 11 and the runner 12, is to be understood to be conventional and no invention is claimed therein except in the combination disclosed.

Also slidable upon the rule 11 is a marking unit, indicated generally by the reference character 15, which comprises an elongated channeled body 16 having end walls 17. The back or bottom wall of body 16 is provided with a transverse channel or groove 18 upon one side of a medial dividing plane which channel or groove is sized to permit the rule 11 to slide therethrough without looseness or play. An overlying spring plate 19 secured by screws 21 retains the unit in place and against the face of the rule 11. Spring plate 19 has ends which normally bow outwardly, as illustrated in dotted lines in Figure 4, so that upon being drawn against the body back by the screws 21 it will be forced tightly against the face of the rule to provide sufficient friction to prevent unintentional sliding of the marking unit thereon.

An elongated screw 23, having reversed threads upon opposite sides of a centrally located knurled cylindrical enlargement 24, extends between the end walls 17 of body 16 being rotatably supported in the end walls by pins 26 on the ends of screws 27. Interiorly threaded nut members 29 ride at equal distances from the mid-point of screw 23, the outer dimensions of the nuts permitting them to slide without turning in the channel body 16 while projecting slightly therefrom at the open side. Each nut 29 carries a pointed pin 31 which projects through an elongated slot 32 in the back wall of body 16. Markings are arranged along the edges of slots 32 to indicate the distance spacing the pins 31 from the medial center plane of the marking unit.

In the use of the gage constructed in accordance with the present invention let it be assumed that it is desired to fix accurately the centers of holes to be drilled in the face of a drawer for handle-supporting bolts. Let it be assumed also that it is desired that the holes are to be located at a certain distance below the upper edge of the drawer face, and that they are to be spaced a certain distance upon each side of a medial center line. To place the center marks in the desired positions the runner 12 of the Starrett rule or square is positioned upon the rule proper 11 at a particular height and is secured in place. The marking unit 15 is then positioned thereunder at a distance such that with the straight underside of the runner 12 resting upon the upper edge of the drawer face the pins 31, which are to fix the hole centers, will be spaced at the desired height below that upper edge. The pins 31 are positioned a fixed distance below the top edge of the body 16, and the user can know their distance from the runner 12 by adding that fixed distance to the distance separating the runner from the upper edge of body 16. In addition to fixing their distance below the top of the drawer it is also desirable that the handle holes be spaced by a definite distance upon opposite sides of a center line. The desired distance between the pins 31 is obtained by the operator manually rotating cylinder 24, and with it the screw 23, whereupon the nuts 29 upon opposite sides thereof are simultaneously moved outwardly or inwardly, depending upon the direction of screw rotation. To space the pins 31 farther apart the cylinder 24 is rotated in one direction, and to move the nuts 29 toward each other it is rotated in the opposite direction. The distance separating the pins is indicated upon the scale provided opposite each pin slot 32.

While the particular apparatus herein shown and described in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claim.

I claim:

In a marking gage of the type adapted to indicate the centers of screw holes for drawer pulls relative to the top edge of a drawer front, an elongated rule adjustably supporting for longitudinal movement therealong a runner having a straight edge extended perpendicularly from said rule adapted to lie along the top edge of a drawer front and including manually operable means to retain it in a selected longitudinal position on said rule, and a marking unit slidably mounted on said rule for movement toward and from said runner and comprising an elongated rigid body extended transversely of and upon both sides of said rule and having elongated slots extended perpendicularly to said rule and rigid ends, said body being transversely channeled between its ends to receive said rule, means including a closure plate for said channel having its outer surface flush with the surface of said body to retain said rule frictionally in said channel and against unintended displacement relative to said unit, said unit also including a rotatable screw oppositely threaded upon opposite sides of said rule and the ends of which are mounted for rotation at the rigid ends of said body and which is formed between its own ends with a knurled cylindrical surface adapted to receive a rotating force, a pair of spaced internally threaded nut members carried by said screw in sliding abutting contact with said body to prevent their rotation upon the rotation of said screw, each of said nut members carrying a rigid marking element pointed at its end and which extends through the adjacent slot in said body in position to make marking contact with a drawer front adjacent said rule and said unit body upon the application of a tapping blow force to said knurled cylindrical surface.

GEORGE ROBERT LEE.

REFERENCES CITED

The following references are of record in the file of this patent:

UNITED STATES PATENTS

| Number | Name | Date |
|---|---|---|
| 98,504 | Kenny | Jan. 4, 1870 |
| 436,166 | Barrett | Sept. 9, 1890 |
| 533,200 | Nuhn | Jan. 29, 1895 |
| 769,196 | Spalding | Sept. 6, 1904 |
| 845,043 | Anderson | Feb. 26, 1907 |
| 1,273,510 | Lindquist | July 23, 1918 |
| 1,298,866 | Beach | Apr. 1, 1919 |
| 2,045,360 | Kaufmann | June 23, 1936 |

FOREIGN PATENTS

| Number | Country | Date |
|---|---|---|
| 21,410 | Great Britain | Oct. 21, 1914 |